United States Patent [19]

Sato et al.

[11] Patent Number: 4,760,459
[45] Date of Patent: Jul. 26, 1988

[54] BINARY DATA COMPRESSION AND EXPANSION PROCESSING APPARATUS

[75] Inventors: Fumitaka Sato; Shigekazu Sumita; Masayoshi Murayama; Hiromichi Tome, all of Tokyo, Japan

[73] Assignee: Kabushiki Kaisha Toshiba, Kawasaki, Japan

[21] Appl. No.: 18,281

[22] Filed: Feb. 24, 1987

[30] Foreign Application Priority Data

Jul. 30, 1986 [JP] Japan .................. 61-177712

[51] Int. Cl.⁴ ............................................. H04N 1/413
[52] U.S. Cl. ..................................... 358/260; 358/261
[58] Field of Search .................. 358/260, 261; 375/27

[56] References Cited

U.S. PATENT DOCUMENTS

| | | | |
|---|---|---|---|
| 4,259,693 | 3/1981 | Aaron | 358/261 |
| 4,542,413 | 9/1985 | Rallapalli et al. | 358/261 |
| 4,558,371 | 12/1985 | Rallapalli et al. | 358/261 |
| 4,562,484 | 12/1985 | Rallapalli et al. | 358/261 |
| 4,719,514 | 1/1988 | Kurahayashi | 358/261 |

Primary Examiner—Edward L. Coles, Sr.
Attorney, Agent, or Firm—Foley & Lardner, Schwartz, Jeffery, Schwaab, Mack, Blumenthal & Evans

[57] ABSTRACT

According to a binary data expansion processing apparatus of this invention, unicolor image data is generated in a generation section in accordance with data associated with a run length and a color instruction for designating the color of image data to be generated. Unicolor image data exceeding the generated set is combined following the already-generated image data portion in accordance with a point a0, thus generating image data for a byte block of interest. At the same time, a color change point on a reference line corresponding to the byte block of interest is detected by a b1 detector. It is checked from the detected color change point if the combined image data exceeds a byte length. If the combined image data exceeds the byte length, the combined image data for one byte of the combined image data is output to an external device.

26 Claims, 7 Drawing Sheets

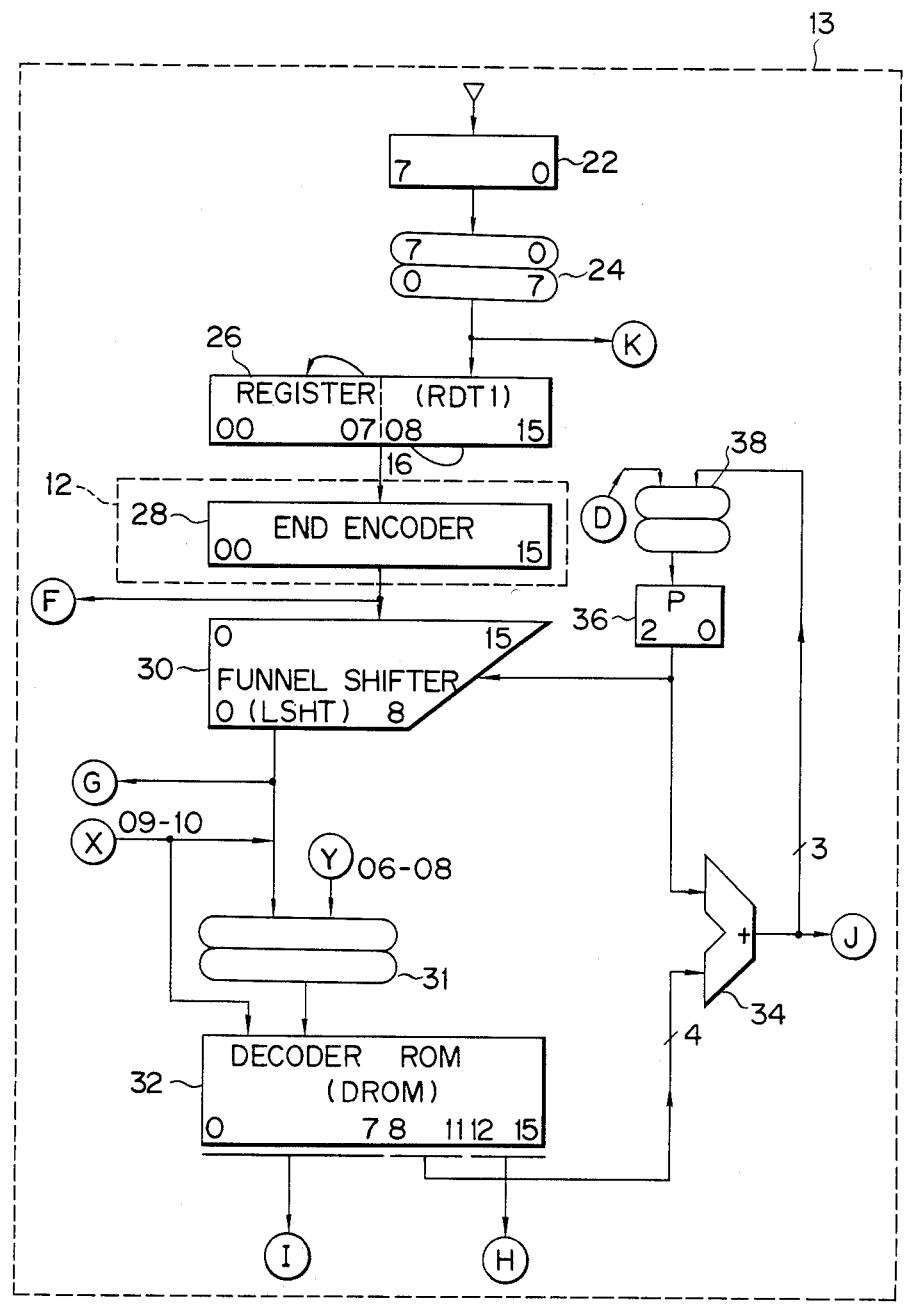
F I G. 2

BINARY DATA COMPRESSION AND EXPANSION PROCESSING APPARATUS

BACKGROUND OF THE INVENTION

The present invention relates to a binary data compression and expansion processing apparatus which can perform high-speed expansion processing of binary data and, more particularly, can perform parallel pipeline processing of the binary data by a two-dimensional coding method.

As a method for compressing and expanding binary data, coding methods, such as the MH method, the MR method, and the M²R method, recommended by the CCITT, are internationally standardized, and are widely adopted. Among the three coding methods, i.e., the MH, MR, and M²R methods, the M²R method has the highest image compression efficiency.

The M²R method is well known as a coding method for Group IV facsimile systems. In this method, a. an End-Of-Line (EOL) code is omitted,
b. a k parameter is set to be infinite, and
c. all the bits of a reference line at the beginning of a page represent white pixels.

With these assumptions, a data compression ratio can be improved over that of the MR method. If a transmission error, if any, occurs, the error is sequentially transmitted to subsequent scanning lines as a principal problem. In order to prevent this, one-dimensional coding scanning lines are inserted in compression processing. The k parameter is the number of two-dimensional coding scanning lines between these one-dimensional coding scanning lines.

A conventional binary data compression and expansion processing apparatus was realized in software, using a general-purpose microcomputer in order to perform expansion processing of encoded data according to these methods. In this processing, there is no problem when such an apparatus is applied to a facsimile system whose data transmission rate is limited to 9600 bps. However, when the conventional apparatus is used to display image data on work stations of a computer system, a good man-machine interface, for example, a page response time of ½ sec or less, cannot be achieved. Therefore, when the sequential expansion processing is executed in accordance with the M²R method, the operating speed is considerably reduced, when compared with the MH method.

One cause of the above problem lies in the processing method of the entire system. More specifically, in a conventional system, decoding is performed in a bit serial manner. In order to solve the problem, parallel processing, advanced processing, and pipeline processing are widely utilized. The binary image data expansion processing can be apparently divided into:

a. decoding processing of code
b. generation processing of image data for the decoded code Therefore, decoding and generation processing can be parallel-performed by separate hardware arrangements. In such arrangements, while a code is expanded, the next code is decoded, and the entire processing can be then pipelined. When binary data encoded by MH and MR methods is expanded, there is no problem in the advanced processing. However, the M²R method has the following problems.

In all the MH, MR, and M²R methods, the starting run of each line is always a white run and must be decoded to be white pixels. In the case of the MH and MR methods, an EOL code is used. Therefore, a decoding processing section which performs the advanced processing can detect the beginning of the next line due to the presence of an EOL code, regardless of progress of generation processing by a generation processing section.

However, since there is no EOL code in the M²R method, the beginning of the next line can only be detected when the generation processing section develops each code and reaches an end of line. Therefore, if the beginning of the next line is indeterminate, it cannot be determined if the color of this portion is forcibly determined as white.

As a result, a decoding operation of a horizontal mode using separate code tables for a white run and a black run cannot be started in an advanced manner. More specifically, in the expansion processing of the M²R method of a conventional apparatus, the advanced processing cannot be effectively performed.

Furthermore, when deviation δ of point a1 is detected by the advanced decoding processing, generation processing of two-dimensional code data encoded by the MR or M²R method is conventionally realized as follows:

a. image data on a reference line is scanned to detect the position of point b1,
b. b1+δ=a1, and
c. a run length is calculated by (a1−a0=run length), and image data is generated in correspondence with the calculated run length. Therefore, the generation processing of operations (a) to (c) must be sequentially performed in this order, resulting in a low expansion processing speed. To prevent this problem, it is necessary that the operations (a) to (c) are performed substantially simultaneously.

SUMMARY OF THE INVENTION

It is an object of the present invention to provide a binary image data compression and expansion processing apparatus which can perform detection processing of point b1 and generation processing of image data having a detected run length, not in a sequential manner but in a parallel manner, so as to improve a processing speed.

In order to achieve the above object, there is provided a binary data compression and expansion processing apparatus which can efficiently execute image data generation processing, comprising:

counter means (42) for holding an input data corresponding to a run length data of the code, for counting down the held data by data corresponding to a first predetermined length for each generating step, for holding the counted-down data, and for outputting the held data;

generating means (46) for inputting the held data in the counter means (42) and control data, and for generating unicolor image data having the first predetermined length and a color designated by the control data, and for outputting the generated unicolor image data as combining image data;

holding loop means (50, 60, 62, 64) for generating image data by combining the combining image data, after a remained image data held therein in accordance with input generation bit position data in one generating step, for outputting the generated image data in a region for the second predetermined length beginning from a leading bit thereof as an interest block, when it is detected that the length of the generated inmage data is the first predtermined length or more, and for holding the remained image data for the next generating step, the generation bit position data indicating a bit position within the interest block where the next combining image data is to be combined; and bit position detecting means (56, 100, 112, 114, 122) for determining a bit position where the next combining image data is to be combined in accordance with the held generation bit position data and the held data from the counter means (42), for holding the updated generation bit position data in accordance with the deetermined bit position, for outputting the generation bit position data held therein, and for detecting that the generated image data has the first predetermined length based on the determined bit position.

According to the present invention, the position of point b1 is detected in image data on a reference line, and image data to be generated is processed in parallel therewith, thereby improving an expansion processing speed.

BRIEF DESCRIPTION OF THE DRAWINGS

FIG. 2 is a block diagram showing the arrangement of a decoding section and an encoding end processing section in a decoding processing section shown in FIG. 1;

DETAILED DESCRIPTION OF THE PREFERRED EMBODIMENT

A binary data compression and expansion processing apparatus according to an embodiment of the present invention will now be described in detail with reference to the accompanying drawings.

Figure 1:
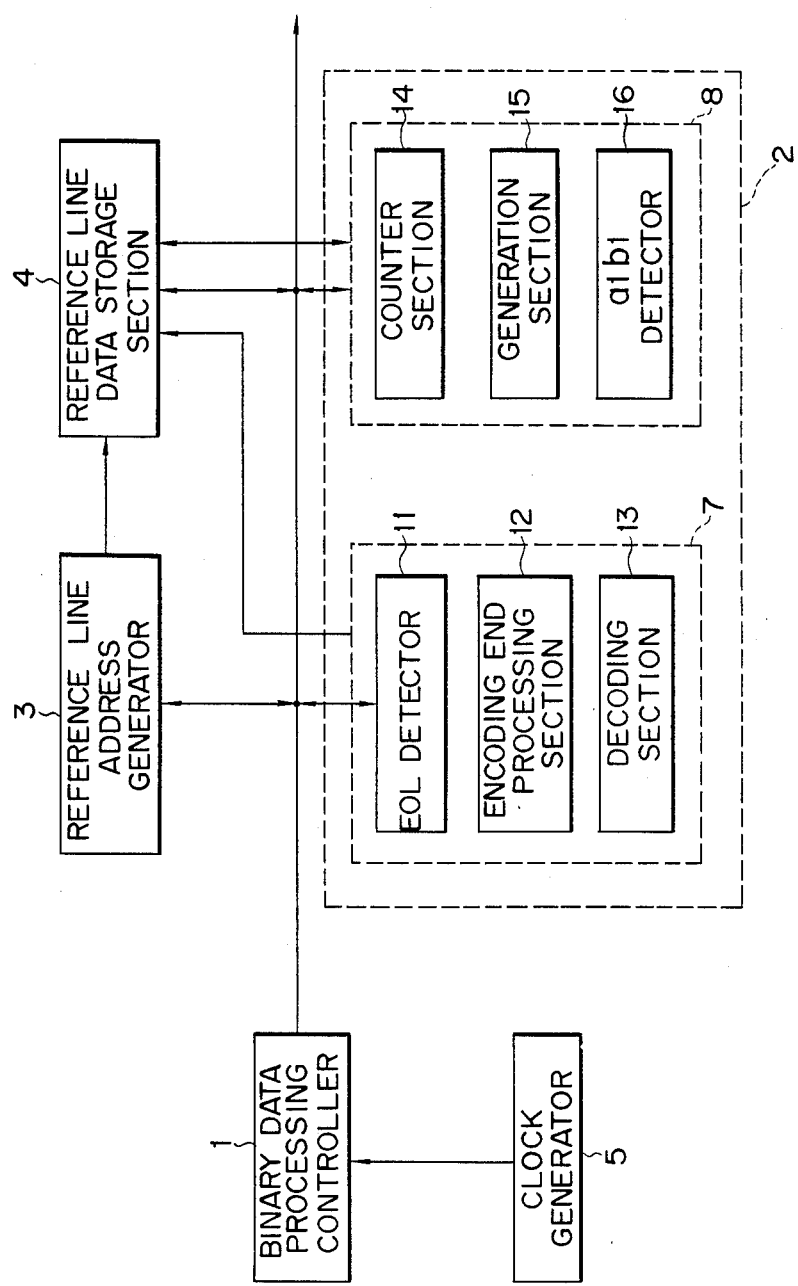
FIG. 1 is a block diagram of a binary data compression and expansion processing apparatus according to the present invention.

The arrangement of the binary data compression and expansion processing apparatus according to an embodiment of the present invention will first be described with reference to FIG. 1.

The apparatus of this embodiment comprises binary data processing controller 1 for controlling the operation of the entire apparatus, compression and expansion processing section 2 for generating binary image pattern data when input binary data is a code and for generating a code when input binary data is image pattern data, reference line data storage section 4 for storing reference line data, reference line address generator 3 for generating address data for storage section 4, and clock generator 5 for generating control clocks.

Controller 1 has flip-flop FBLKP (not shown) for designating a color of image data to be generated, and flip-flop FODRDY (not shown) for causing register RODT to output generated image data. Flip-flop FBLKP designates a black pattern when it is set to "1", and designates a white pattern when it is set to "0".

Compression and expansion processing section 2 comprises decoding processing section 7 for generating run length data when input binary data is a code, and generation processing section 8 for generating binary image pattern data processed in accordance with the run length data.

Decoding processing section 7 comprises EOL detector 11 for checking if generation processing is completed to the end of a line and for detecting an EOL code under a given condition, encoding end processing section 12 used to generate an EOL code during compression processing, and decoding section 13.

Generation processing section 8 comprises counter section 14 for latching an output from decoding section 13 and counting the number of processed bytes, generation section 15 for generating binary data processed in accordance with data from counter section 14, and a1b1 detector 16 for detecting points a1 and b1.

Clock generator 5 for generating clocks is connected to controller 1. Controller 1 controls operation timings of decoding processing section 7, generation processing section 8, and reference line address generator 3 in accordance with the clocks from generator 5, and outputs a necessary instruction upon progress of processing.

The arrangement of the respective sections will be described hereinafter in detail with reference to FIGS. 2 to 5. Note that a control signal is omitted from the drawings for the sake of simplicity.

First, decoding processing section 7 will be described in detail. FIG. 2 shows encoding end processing section 12 and decoding section 13 of decoding processing section 7. EOL detector 11 will be described later with reference to FIG. 4 together with reference line address generator 3.

Decoding section 13 is constituted by a circuit shown in FIG. 2, excluding encoding end processing section 12. One-byte data is input to and latched by latch 22 from an input data bus. Binary data latched by latch 22 is inverted by inverter 24, and is then input to register 26 and EOL detector 11 as data K. Register 26 shifts previously input byte data RDTI15-08 to be data RDTI07-00 in accordance with a control signal from controller 1, latches new input data as data RDTI15-08, and holds them as 16-bit data together with data RDTI07-00.

16-bit register data RDTI15-00 is output to funnel shifter 30 via encoding end processing section 12. Data RDTI07-00 is output to reference line data storage section 4 as byte data F. Decoding pointer 36 indicates an LSB (Least Significant Bit) position of a code to be decoded or a part of the code to be extracted next from register data RDTI15-00 input to funnel shifter 30. An indication value from decoding pointer 36 is supplied to funnel shifter 30 in accordance with a control signal from controller 1.

Funnel shifter 30 generates 9-bit output LSHT08-00 obtained by left-shifting data RDTI15-00 by the indication value from decoding pointer 36, and outputs it to selector 31. In the case of processing in the uncompressed mode, data LSHT04-00 of output data LSHT08-00 is output to generation processing section 8 as data G. Data LSHT08-00 is added to data X, corresponding to data LSHT10-09, from controller 1, and is output to selector 31 as 11-bit data. Selector 31 receives data Y, corresponding to data LSHT08-06 or LSHT08-

07, from controller 1. These input data are selected in response to a control signal from controller 1, and are output to decoder ROM 32 as 11-bit address data. Also, data X is supplied to decoder ROM 32.

Decoder ROM 32 outputs 16-bit data DROM15-00. More specifically, as data DROM07-00, input binary data is output in the case of compression processing, and run length data is output in the case of expansion processing. If data indicating an actual run length, i.e., a color change point is expressed by $\delta$ in two-dincensional code, run length data output from decoder ROM 32 is given as $(\delta-4)$. Data I is supplied to processing section 8. As data DROM11-08, data indicating the significant data length, i.e., the length of processed data of input binary data, is output. As data DROM15-12, control data H for designating the next state, i.e., data associated with encoded data to be decoded next in an expansion processing is output.

Data DROM11-08 is output to adder 34. At the same time, adder 34 receives data of decoding pointer 36. Therefore, data DROM11-08 is added to the data from decoding pointer 36, and the summed data is output to selector 38. Selector 38 also receives data D, which is used in compression processing and is not used in expansion processing, from a1b1 detector 16. Therefore, when expansion processing is performed in accordance with a control signal from controller 1, the summed data again becomes the content of decoding pointer 36. In this manner, pointer 36 indicates an LSB position of a code next to the decoded code.

If $2^3$-bit data becomes "1" data as a result of addition of adder 34, this is signaled to controller 1 by means of data J. This means that processing for one byte is completed. Controller 1 outputs a control signal to register 26 in accordance with data J from adder 34. Register 26 left-shifts data RDTI15-08 in units of bytes to be data RDTI07-00 in accordance with the control signal from controller 1. New byte data latched by latch 22 is latched in the data RDTI15-08 portion of register 26 in accordance with a control signal from controller 1. The lower 3 bits of the summed data of adder 34 are output to pointer 36, so that the LSB position of a code to be decoded is always present in data RDTI07-00 of register 26.

Figure 3:
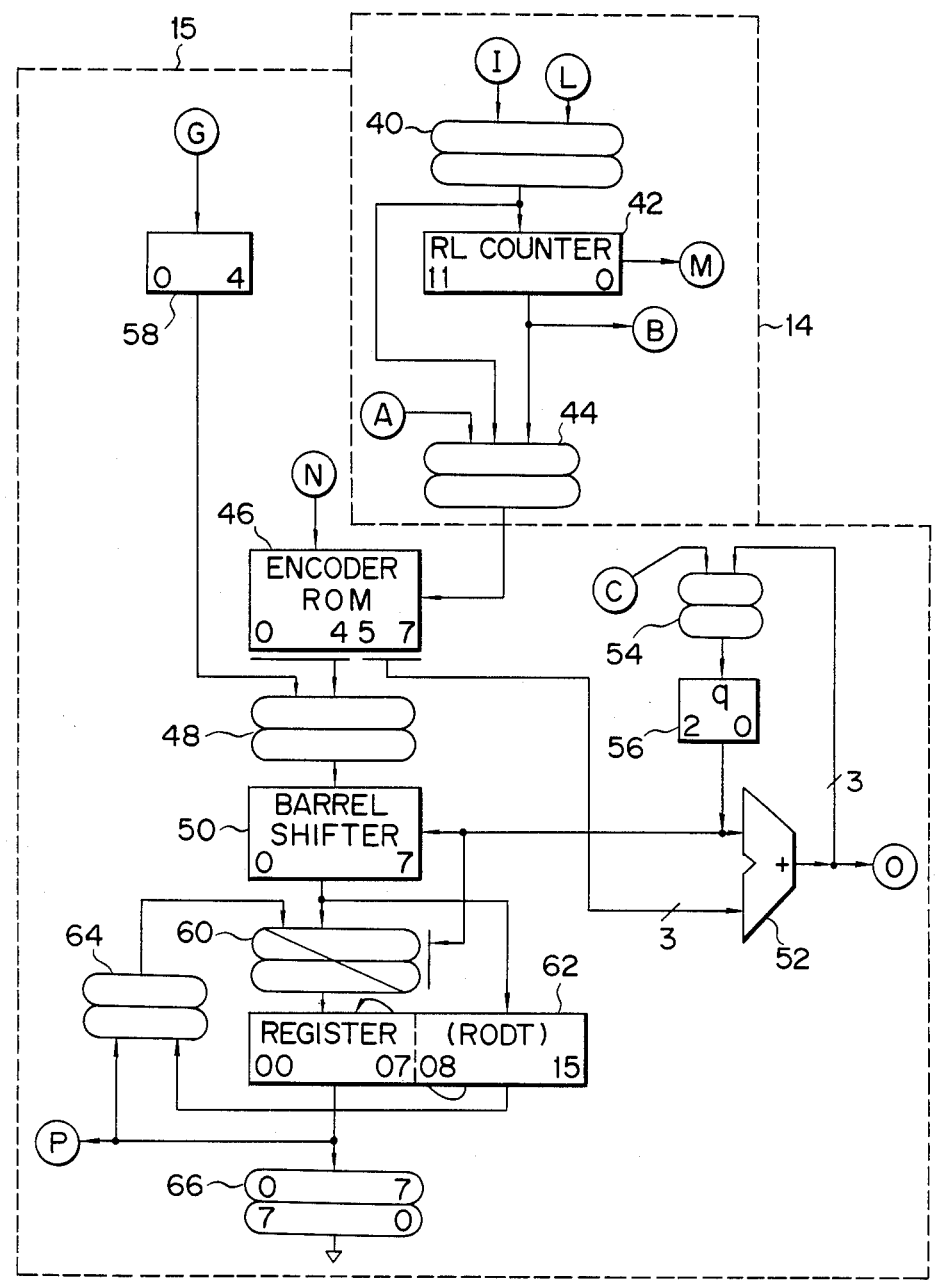
FIG. 3 is a block diagram showing the arrangement of a counter section and a generation section in a generation processing section shown in FIG. 1.

Counter section 14 and generation section 15 of generation processing section 3 will be described in detail with reference to FIG. 3. Counter section 14 comprises selectors 40 and 44, and RL counter 42. Generation section 15 is constituted by a circuit shown in FIG. 3 excluding counter section 14.

Decoding result I from decoder ROM 32 is input to selector 40. Selector 40 also receives data L from controller 1. These data are selected in response to a control signal from controller 1, and are output to RL counter 42. Of the output data from selector 40, a 02-00-bit portion is also output to selector 44. RL counter 42 is a counter having a 12-bit length, and latches data from selector 40 at a predetermined position in accordance with a control signal from controller 1. RL counter 42 counts down in accordance with count pulses from controller 1 using the output data from selector 40 as a preset value, and outputs the count, to selector 44 and a1b1 detector 16 as data B.

The output from RL counter 40 is also output to controller 1 as data M in order to certify if the number of processing operations determined by the decoded code is completed. Selector 44 receives an output from counter 42, the output from selector 40, and data A from a1b1 detector 16, and selects one of them in response to a control signal from controller 1 to output the selected data to encoder ROM 46.

Encoder ROM 46 receives data N from controller 1, which includes data from flip-flop FBLKP for color designation and data indicating expansion or compression processing. Encoder ROM 46 receives data from selector 44 and data N from controller 1 as address data, and outputs 8-bit data EROM07-00 to selector 48. In data EROM07-00, data EROM07-05 is supplied to adder 52. A circuit constituted by adder 52, selector 54, and image pointer RBPQ 56 is operated in the same manner as the corresponding circuit of decoding processing section 7. More specifically, image pointer RBPQ 56 outputs an indication value which is added to data EROM07-05 by adder 52 upon completion of processing. The sum is then output to selector 54.

Selector 54 receives data C from detector 16, and selects it in accordance with a control signal from controller 1 to serve as the indication value of image pointer RBPQ 56. As a result of addition of adder 52, if $2^3$ bits are "1", this is signaled to controller 1 by means of data O.

Selector 48 receives data EROM07-00 and data G from decoding processing section 7 via latch 58, and selects one of them in response to a control signal from controller 1. The selected result is output to barrel shifter 50. Barrel shifter 50 rotates input data in accordance with the indication value from image pointer RBPQ 56 and outputs it to selector 60. At the same time, shifter 50 outputs the processed data to register 62 as data RODT15-08. One of data RODT07-00 and data RODT15-08 is selected by selector RRSEL 64 in accordance with a control signal from controller 1, and the selected data is input to selector 60. Selector 60 generates an output in accordance with the indication value from image pointer RBPQ 68 as data RODT07-00. Register 62 shifts data RODT15-08 to be data RODT07-00 in accordance with a control signal from controller 1. Data RODT07-00 and data RODT15-08 are output to selector RRSEL 64. Data RODT07-00 is output to reference line data storage section 4 as data P, and at the same time, is output to inverter 66 similar to inverter 24, and is finally output onto an output data bus.

Figure 4:
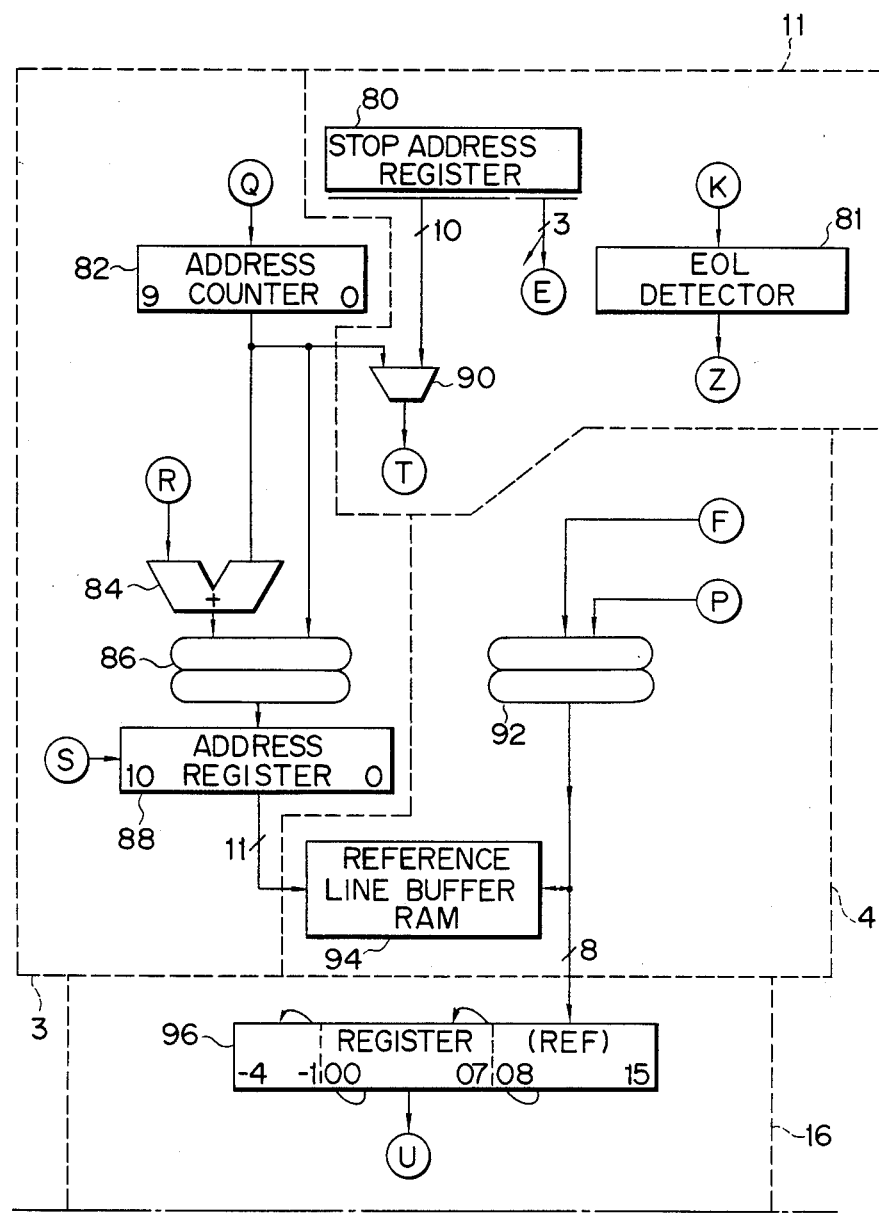
FIG. 4 is a block diagram showing the arrangement of a reference line address generator and an EOL detector in the decoding processing section shown in FIG. 1.

The arrangement of reference line address generator 3, EOL detector 11 of decoding processing section 7, and reference line data storage section 4 will be described with reference to FIG. 4.

EOL detector 11 of decoding processing section 7 comprises stop address register 80, comparator 90, and EOL detector 81. Reference line address generator 3 comprises address counter 82, adder 84, selector 86, and address register 88. Reference line data storage section 4 comprises selector 92 and reference line buffer RAM 94.

Stop address register 80 latches, in advance, one-line run length data, and outputs upper 10-bit data to comparator 90. Address counter 82 receives data Q from controller 1. Data Q is input to counter 82 each time one-byte binary data processing is completed, and counter 82 accumulates data Q until the one-line processing is completed. Therefore, an output from address counter 82 indicates the byte position to which binary data processing has progressed on the corresponding processing line.

Address counter 82 is reset in response to a control signal from controller 1 upon completion of one-line processing, and restarts counting when a new line's processing is started. A count value of address counter 82 is output to comparator 90, selector 86, and adder 84. Comparator 90 also receives run length data for one line from stop address register 80 in units of bytes, and compares it with the count value of address counter 82. When a coincidence is found therebetween, this means that image generation has reached a byte position before the end of the corresponding processing line. At this time, data T is output to controller 1.

Adder 84 receives data R from controller 1, and adds it to the count value from address counter 82 to output the sum to selector 86. Selector 86 selects address data from address counter 82 and address data from adder 84 in response to a control signal from controller 1, and outputs the selection result to address register 88.

Address register 88 also receives data S from controller 1, and outputs it to reference line buffer RAM 94 together with the output from selector 86.

Reference line buffer RAM 94 stores image data on a reference line, and image data on the corresponding processing line for processing of the next line. Therefore, image data for two lines are stored in RAM 94, and data S is supplied to address register 88 from controller 1 in order to switch designation memory areas, i.e., to determine which area is to be selected.

Selector 92 receives input byte image data F, i.e., data RIDT07-00 via encoding end processing section 28, and byte data P, i.e., processed image data RODT07-00, and selects one of them in response to a control signal from controller 1, thereby storing the selection result in reference line buffer RAM 94.

As is clearly understood from the above description, upon readout of reference line data, selector 86 selects the output data from adder 84, and upon storage of reference line data, selects the output data from address counter 82 to output it.

At the beginning of processing for a new line, when reference line data is read out, "2" and "1" are input to adder 84 as data R from controller 1 in order to output reference data necessary for register 96. Then, register 96 can hold necessary reference line data. Data REF-3-10 from register 96 is output to b1 detector 102 as data U.

EOL detector 81 detects an EOL code when an error occurs in, e.g., detector processing section 7 or generation processing section 8. Detector 81 receives data K from decoding processing section 7, and signals detection of an EOL code to controller 1 by means of data Z.

Figure 5:
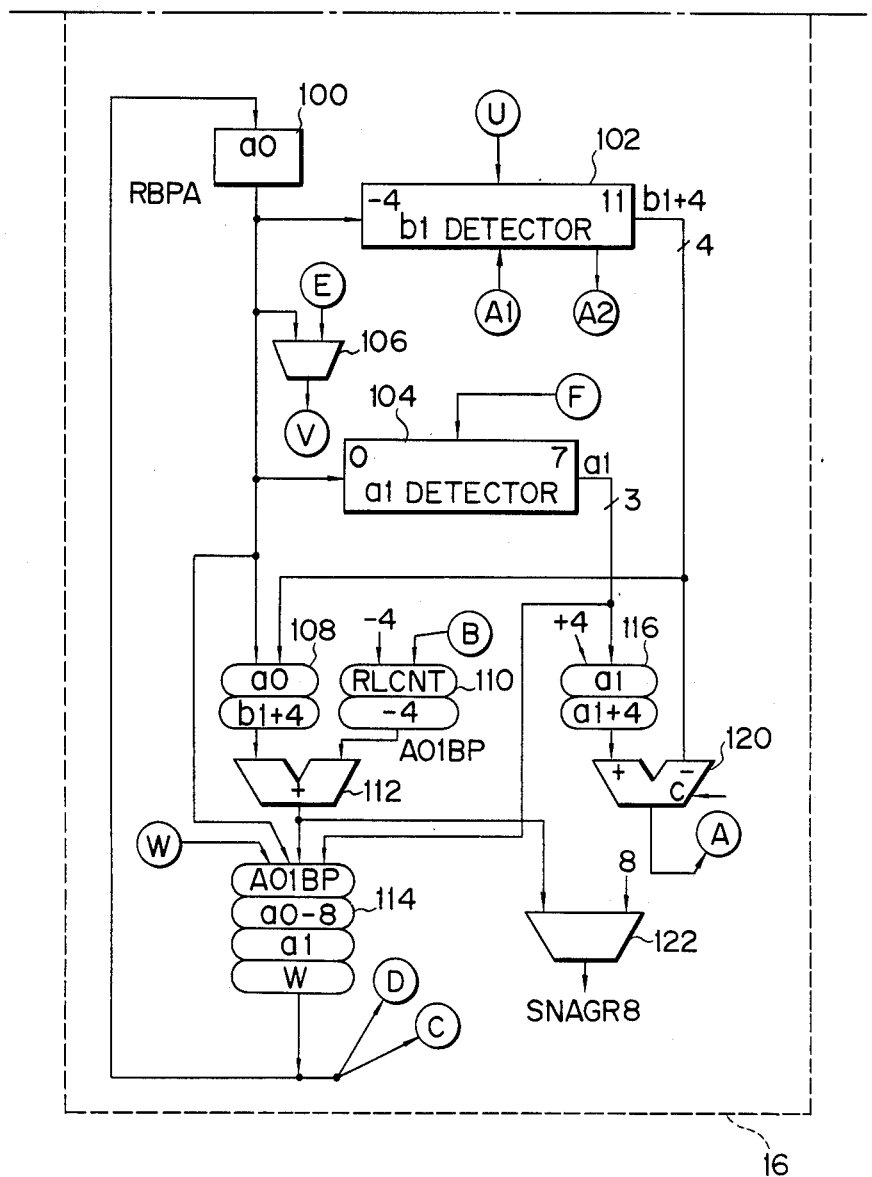
FIG. 5 is a block diagram of an a1b1 detector in the generation processing section shown in FIG. 1.

The arrangement of a1b1 detector 16 of generation processing section 8 will now be described with reference to FIG. 5. a1b1 detector 16 is frequently used in a vertical mode and a pass mode in a two-dimensional mode.

Data read out from reference line buffer RAM 94 is latched by register 96 as data REF15-08. Register 96 shifts data REF07-04 in data REF07-00 to be data REF-4—1 and data REF15-08 to be data REF07-00 in units of bytes, so as to latch data from reference line buffer RAM 94 as data REF15-08.

b1 detector 102 receives data U of reference line from register 96. Detector 102 also receives data A1 from controller 1 to detect a color change point. Delector 102 informs absence b1 point to controller 1 by data A2. a1 detector 104 receives data F from encoding end processing section 28. b1 and a1 detectors 102 and 104 receive an indication value from a0 pointer RBPA 100, and respectively detect positions a1 and b1 of pixels having changes on an encoding line and a reference line on the right side of point a0, i.e., ahead of point a0 in the processing direction, on register 96. Position b1 detected by b1 detector 102 is supplied to subtractor 120 and selector 108. "+4" is added to position b1 in association with register 96.

Position a1 detected by a1 detector 104 is supplied to selectors 116 and 114. Selector 116 selects output data from data from a1 detector 104 or data "+4" from controller 1, and outputs the selected data to subtractor 120. Subtractor 120 outputs its calculation result to generation processing section 8 as data A.

Selector 108 receives the indication value from a0 pointer 100 and output b1 from b1 detector 102. Selector 110 receives data "−4" from controller 1 and data B, as output RLCNT from RL counter 42, from generation processing section 8. Selectors 108 and 110 respectively select their outputs in response to a control signal from controller 1, and output them to adder A01BP 112. Adder A01BP 112 outputs the sum to selector 114.

Selector 114 also receives detection result a1 from a1 detector 104, the indication value from a0 pointer 100, and data W from controller 1, and selects its output in response to a control signal from controller 1. The output from selector 114 is supplied to generation processing section 8 as data C and to decoding processing section 7 as data D. The output from selector 114 is also latched by a0 pointer RBPA 100 as the indication value. The indication value of a0 pointer 100 is compared with data E from address register 80 by comparator 106, and the comparison result is output to controller 1 as data V.

Figure 6:
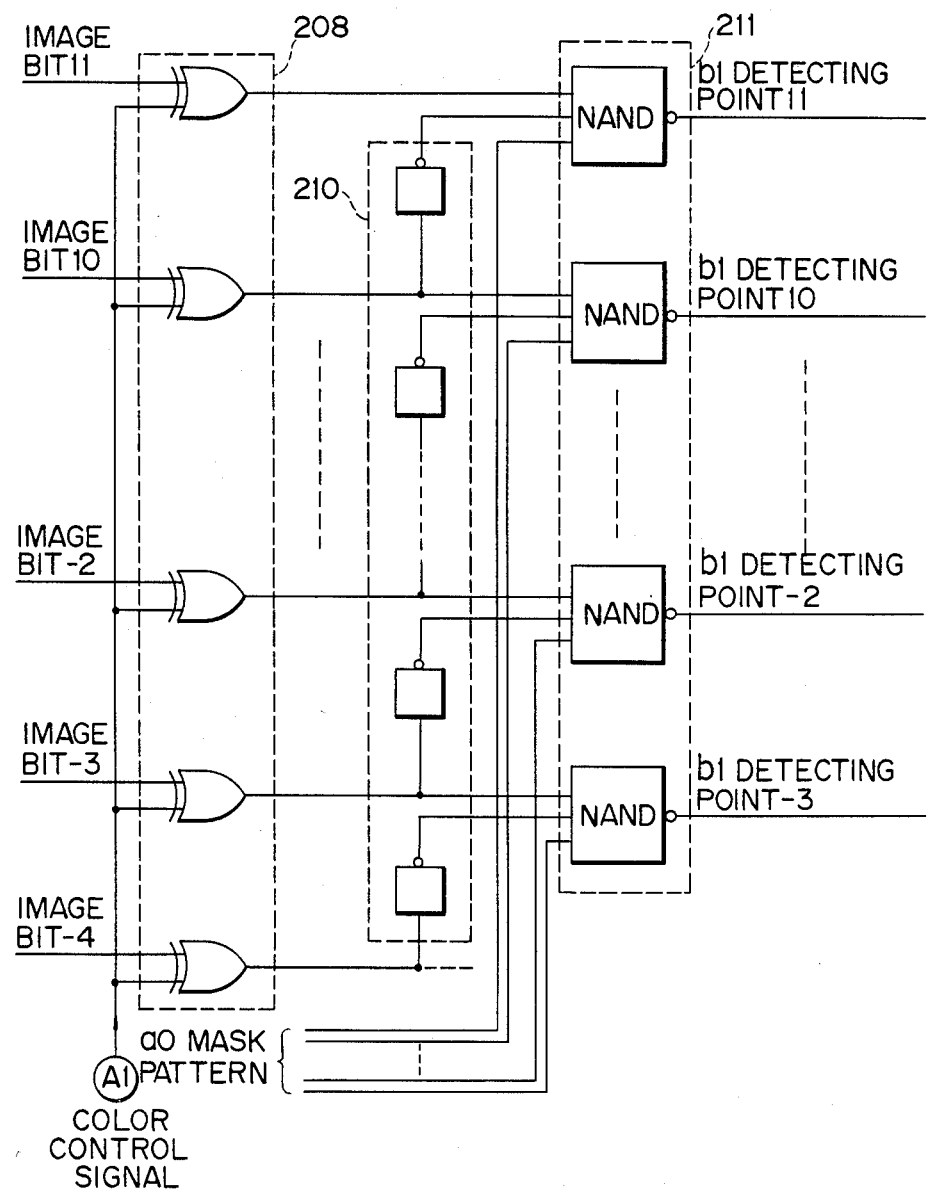
FIG. 6 is a detailed diagram of a b1 detector shown in FIG. 5.

The output from adder A0lBP 112 is output to comparator 122. Comparator 122 also receives a value "8" indicating a data processing size from controller 1, and makes a comparison between the two inputs. The comparison result is supplied to controller 1 as signal SNAGR8 when the output from adder A01BP112 is 8 or more.

b1 detector 102 is configured as shown in FIG. 6. This circuit checks a color change point and a white run is processed as "0" and a black run is processed as "1". For corresponding bits ahead of point of interest a0 in the processing direction, "1" is supplied as a mask pattern. Reference line data -4-11 input to b1 detector 102 each is input to one terminal of exclusive OR gates 208, respectively. The other terminal of the exclusive gates 208 receives a color control signal. More specifically, the color control signal is "0" when a color change point from a white run to a black run iws checked and is "1" when a color change point from a black run to a white run is checked. Data -4-11 from exclusive OR gates 208 is input to corresponding NAND gates 211 bit by bit. Each of NAND gates 211 also receives the a mask pattern and data from a previous bit. In other words, in terms of a 3rd-bit NAND gate, 2nd-bit data inverted by corresponding inverter 210 is input thereto. Each of NAND gates 211 calculates a logical product of these inputs to detect a color change in pixel components at the corresponding bit position. Therefore, if all the associated bits are subjected to the same processing, a change color point of pixel components ca be easily and immediately detected.

Figure 7A:
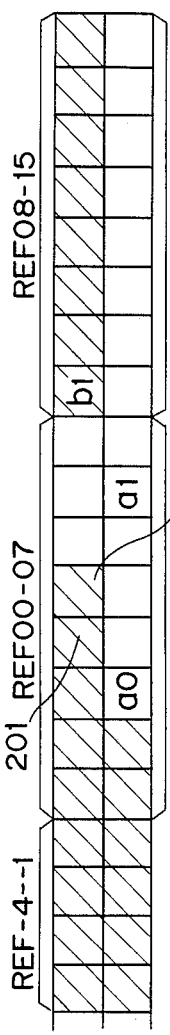
FIGS. 7A to 7D are views showing states of image data of a reference line and a generation processing line in expansion processing.

The reason why inverted previous bit data is input to NAND gate 211 respectively is that points 201 and 202 must not detected as color change point b1 of a reference line in the case of a reference line and a processing line shown in FIG. 7A. That is, a condition that the color of dot on the left side of the corresponding bit is an opposite color is added. Thus, black dots 201 and 202 can be prevented from being detected as point b1.

The operation of the binary data compression and expansion processing apparatus of the present invention will now be described.

First, expansion processing will be described in detail.

When expansion processing of a new page is started, control data, including data for determining the MH, MR, or M²R method, is supplied in the case of a facsimile system. The control data includes data indicating a run length for one line. Stop address register 80 stores the run length data for one line. In processing by the M²R method, all the bits of image data on the reference line at the beginning of a page are white or "0". In this state, an EOL code is first detected by EOL detector 81 to start expansion processing.

When expansion processing for a new line is started, a necessary condition is initialized. For example, the following initialization is performed. Address counter 82 is reset, and data S is supplied to bit "10" of address register 88 from controller 1 in order to switch addresses. Thereafter, "1" is input to adder 84 as data R from controller 1, and first byte data on the reference line is read out from reference line buffer RAM 94 to be stored in register 96 as data REF15-08. After the data is shifted to be data REF07-00, "2" is supplied from controller 1 as data R, and byte data read out from reference line buffer RAM 94 is stored in register 96 as data REF15-08, in the same manner as described above. Pointers 36, 56, and 100 are reset. Data W is input to selector 114 from controller 1, and is selected in accordance with a control signal from controller 1, so that a new value is set in a0 pointer 100. The color is therefore set to be white.

For example, assume that a code encoded by the M²R method is input to decoding processing section 7 via an input data bus in units of 8 bits, i.e., 1 byte, after the aforementioned initialization is performed, and is latched by latch 22 in accordance with a control signal from controller 1.

In a register used mainly for holding image data and a compressed code, a leftmost bit is bit "0". Meanwhile, in a register used mainly for holding binary control data, a rightmost bit is bit "0". Therefore, the input binary data mus be inverted. The input binary data is thus inverted by inverter 24, and is then output to register 26 and EOL detector 11. In register 26, previously input byte data RDTI15-08 is shifted to data RDTI07-00 in accordance with a control signal from controller 1, and new input data is latched as data RDTI15-08 and is held as 16-bit data together with data RDTI07-00. In this manner, at the beginning of a page, 2-byte binary data is input.

16-bit register data RDTI15-00 is output to encoding end processing section 28. This circuit is operated only in compression processing, and simply allows data to pass therethrough in expansion processing. Therefore, 16-bit register data RDTI15-00 is output to funnel shifter 30 via processing section 28.

Decoding pointer 36 indicates the LSB position of a code, to be extracted next, from register data RDTI15-00 input to funnel shifter 30. Funnel shifter 30 generates 9-bit output LSHT08-00 obtained by left-shifting data RDTI15-00 by the number of bits indicated by an indication value from pointer 36. For example, if the value of pointer 36 is "3", funnel shifter 30 selects data RDTI11-03 from input data RDTI15-00, and outputs it as data LSHT08-00.

Data LSHT08-00 is added to data corresponding to data LSHT10-09 from controller 1, and the result is output to selector 31. Selector 31 also receives data corresponding to data LSHT06-08 or LSHT07-08 from controller 1. These input data are selected in accordance with a control signal from controller 1, and the selected data is output to decoder ROM 32 as 11-bit address data.

In this case, with the M²R method, if generation processing of an immediately preceding decoded code is not completed, the control signal associated with selector 31 is not generated. Therefore, selector 31 awaits the completion of generation processing in a state that the data LSHT08-00 is supplied.

If selector 31 does not await the completion, a white run cannot be set for a beginning code of the next line after processing progresses up to the end of the current processing line. In this case, if decoding for the beginning code is performed, the value of decoding pointer 36 must be reset and decoding must be restarted, resulting in inconvenience.

However, if such advanced processing is not performed, an EOFB code (End of Facsimile Block: the EOFB code has double EOL codes) at the end of a page cannot be decoded and processing is stopped at the EOFB code. Therefore, when an EOL code in the EOFB code is detected by EOL detector 81, decoding is performed by advanced processing in the present invention.

Since the MH and MR methods use an EOL code unlike the M²R method, a code data can be decoded by advanced processing without a waiting the completion of current generation processing. Thus, decoding processing of the M²R method, and even that of the MH and MR methods, can be performed at a higher speed than in a conventional apparatus.

Data LSHT10-00 is output to decoder ROM 32 in response to a control signal from controller 1. If data Y08-06 is selected, the 08-06-bit portion or the 08-07-bit portion of data LSHT10-00 is selected as the corresponding portion of data LSHT, and the data LSHT08-00 portion is shifted toward the MSB direction by corresponding bits to be output to decoder ROM 32. Decoder ROM 32 outputs data associated with a run length as data DROM07-00, data indicating a decoded code length as data DROM11-08, and data indicating the next state as data DROM15-12. At this time, data in the two-dimensional vertical and pass modes are output in the form of run length data ($\delta - 4$).

Data DROM11-08 is output to adder 34. At the same time, adder 34 receives data from pointer 36. Thus, data DROM11-08 is added to the content of pointer 36, and the summed data is output to selector 38. Selector 38 receives signal D, which is used in compression processing and is not used in expansion processing, from a1b1 detector 16. However, since expansion processing is executed in this case, the output from adder 34 is selected in response to a control signal from controller 1. Therefore, the summed data again becomes the content of pointer 36. Pointer 36 indicates the LSB position of a code next to a decoded code in this manner.

When $2^3$-bit data becomes "1" as a result of addition of adder 34, this is signaled to controller 1 by means of data J. This means that decoding processing for one byte is completed. Therefore, controller 1 outputs a control signal to register 26, to left-shift data RDTI15-08 to data RDTI07-00 in units of bytes. New byte data is latched by latch 22 and latched as data RDTI15-08 in register 26 in accordance with a control signal from controller 1. Pointer 36 receives the lower 3 bits of the summed data from adder 34, so that the LSB position of a code to be decoded is always present in data RDTI07-00 of register 26.

The operation of generation processing section 8 for expanding binary data in accordance with the decoding result from decoding section 13 will now be described. Generation processing section 8 will receive the decoding result, i.e., run length data, as described above. A case will first be described wherein a one-dimensional mode code is input to section 7. Assume that the decoding result of a make-up code is input to selector 40. Although selector 40 receives data L from controller 1, this will be described later. If an output from decoder ROM 32 is selected in response to a control signal from controller 1, the output data is input to RL counter 42. RL counter 42 is a counter having a 12-bit length, and stores the decoding result of the make-up code in 6-bit data portion 08-03.

Since the run length of the make-up code output from decoder ROM 32 is a value obtained by decrementing an actual run length by eight bytes, "1" is input to the 02-00 bit portion of RL counter 42 to obtain, i.e., "111". This is because the generation processing is performed in units of bytes. The data RLCNT from RL counter 42 is input to encoder ROM 46 as a part of address data through selector 44. Encoder ROM 46 also receives bit data for color designation and bit data indicating expansion or compression processing from controller 1 as a part of the address data.

In response to the address data input to encoder ROM 46, 8-bit data "00000000" or "11111111" is output from encoder ROM 46. The output data is supplied to barrel shifter 50 via selector 48. Generation processing section 8 has a similar circuit to decoding pointer 36 of decoding section 13. Barrel shifter 50 receives data from pointer 36, so that input data is rotated and output in accordance with the data from pointer 36. However, since all the bits are "0" or "1", there is no difference if the data is rotated or not. Thus, the value of image pointer RBPQ 56 is left unchanged.

At this time, since data is output in units of bytes, no data is output from encoder ROM 46 to adder 52. This is because, since the processing is performed in units of bytes as described above, the value of image pointer RBPQ 56 need not be changed. The output from barrel shifter 50 is supplied to selector 60 and is also supplied to the 15-08 portion of register 62. Selector 60 receives data RODT15-08 through selector RRSEL 64 in the generation processing of the make-up code. Selector 60 also receives data from image pointer RBPQ 56 as in barrel shifter 50.

Selector 60 selects data from selector RRSEL 64 as data from the LSB of image data to be generated to a bit position smaller by "1" from the indication value of image pointer RBPQ 56, and selects the output from barrel shifter 50 as data from the indication value of image pointer RBPQ 56 to the MSB of the image data, thus outputting the selected data as data RODT07-00 of register 62. For example, if the indication value of pointer RBPQ 56 is "3", data from selector RRSEL 64 is selected as data RODT02-00, and data from barrel shifter 50 is selected as data RODT07-03. The data selected by selector 60 is stored as data RODT07-00 of register 62. The run length of the make-up code is 8 bytes or more, and is processed in units of bytes. With the above operation, since one-byte data processing is completed, data RODT07-00 of register 62 is output onto the output data bus through inverter 66, similar to inverter 24, in accordance with a control signal from controller 1. Data RODT07-00 is also supplied to reference line storage section 4 as data P, to be stored therein at an address corresponding to the current value of address counter 88.

Upon completion of the generation processing of one-byte image data, one clock is applied to address counter 82 as data Q to increment it by "1". At this time, in the case of a code encoded by the M2R method, the value of counter 82 is compared with that of stop address register 80 by comparator 90 to check if the processing has progressed up to the end of the line. In the case of a code encoded by the MR or MH method, there is no problem since EOL codes are used.

Data in register 96 is shifted toward the LSB in units of bytes. New reference line data is read out from storage section 4 using the sum of the value of address counter 82 and data R as an address, and is latched in register 96 as data REF15-08. In this case, data a0 of a0 pointer RBPA 100 is not changed. It is checked if data RLCNT of RL counter 42 is equal to "0". When data RLCNT is not equal to "0", data RLCNT is decremented by "1". Whe data RLCNT is equal to "0", data M is output to controller 1 to indicate that the generation processing of the input make-up code is completed. If not completed, data RLCNT from RL counter 42 is again supplied to encoder ROM 46 through selector 44. Processing is repeated in the same manner as described above until the output RLCNT from RL counter 42 becomes equal to "0".

When a run of the same color continues for a length of 2561 or more, a code of a run length of 2560 is repeated. In this case, controller 1 supplies to selector 40 the code of a run length of 2560 and the number of the repeated code. Whe selector 40 selects data L, the same processing as that for the make-up code is performed. When the generation processing for the run length of 2560 is completed once, the number of the repeated code is decrimented by "1", and the same processing is repeated until the content of RL counter 42 is equal to "0".

A case will be described wherein the decoding result of a terminating code is processed. The decoding result is input to the 05-00 portion of RL counter 42 through selector 40. The 05-03 poriton of RL counter 42 is processed in the same manner as that of byte data in the generation processing of the make-up code. Upon completion of the processing of byte data, remaining data 02-00, less than one byte, is processed. Data 02-00, less than one byte, is output to selector 44, and is selected thereby to be input to encoder ROM 46. Data 02-00 is also output to albl detector 16 as data B. Image data is generated in the same manner as the generation processing for a one-byte run length.

When a run length code shorter than one byte has been processed, data B is supplied from RL counter 42 to selector 110. Data B is selected by selector 110 and is supplied to adder 112. Selector 108 selects data a0 from a0 pointer RBPA 100, and supplies it to adder 112. The sum from adder 112 is supplied to comparator 122 and image pointer RBPQ 56 through selectors 114 and 54. As a result, the value of image pointer RBPQ 56 is updated. If comparator 122 determines that the output from adder 112 is "8" or more, it is signaled to controller 1 by signal SNAGR8 that one-byte data processing is completed. When signal SNAGR8 is output, register 62 outputs data RODT07-00 onto the data bus in response to a control output signal from controller 1, and also outputs it to storage section 4 as data P.

If no signal SNAGR8 is output, the next image data is awaited. When the next image data is input to selector 60, data RODT07-00 of register 62 is supplied to selector 60 through selector RRSEL 64.

The above operation can be attained for an MH code portion of a horizontal mode code among codes encoded by the MH method and those encoded by the MR and M²R methods.

Next, generation processing for a code in the pass mode and the vertical mode as the two-dimensional coding mode will now be described.

Run length data from decoding section 13 is loaded to RL counter 42. At this time, since the run length data is stored in the DROM in the form of $(\delta - 4)$, the content of RL counter 42 is also updated to $(\delta - 4)$. In addition, flip-flop FBLKP (not shown) in controller 1 for designating the color is reset or set in accordance with the color of a run associated with the run length data. At the same time, in the data hold loop including register 62 one-byte image data including point a0 of a current processing line is fed back to the data 07-00 portion of register 62 through selector RRSEL 64 and selector 60. The bit position of point a0 in the byte data is loaded to a1 pointer RBPA 100 and image pointer RBPQ 56. The 3rd bit of a0 pointer RBPA 100 is "0". Image data on a reference line has been loaded to register REF 96. Data REF00-07 of register 96 corresponds to data RODT07-00 of register 62 in which the bit position of point a0 is included. The expansion processing of a VL(2) code will be described, wherein point a0 corresponds to the 2nd bit of data RODT07-00 and a reference line has image pattern data shown in FIG. 7A.

At this time, a color change point on a reference line, i.e., point b1 is obtained by b1 detector 102, constituted as shown in FIG. 6. In the case of the reference line shown in FIG. 7A, point b1 corresponds to the 8th bit. Therefore, b1 detector 102 outputs $12 = (8+4)$.

Since VL(2) corresponds to $\delta = -2$, RL counter 42 receives $-6 = (-2-4)$. Adder A01BP 112 receives output "12" from b1 detector 102 through selector 108 and output RLCNT "6" from RL counter 42 through selector 110, and calculates $12 + (-6)$ and outputs the result "6". This output is selected by selector 114, and is set in a0 pointer RBPA 100.

More specifically, this means that a color change point on the current processing line, i.e., point a1 corresponds to the 6th bit of the corresponding byte. While point b1 is detected and point a1 is calculated, generation section 15 generates an image data. Since a color of a run to be generated is determined by flip-flop FBLKP (not shown), a pattern consisting of all "0" bits (white, i.e., FBLKP=0) or all "1" bits (black, i.e., FBLKP=1) is output from encoder ROM 46, and is input to barrel shifter 50 via selector 48. Selector 60 receives image data from register 62. Barrel shifter 50 outputs the input image data to the data 15-08 portion of register 62 and to selector 60.

Figure 7B:
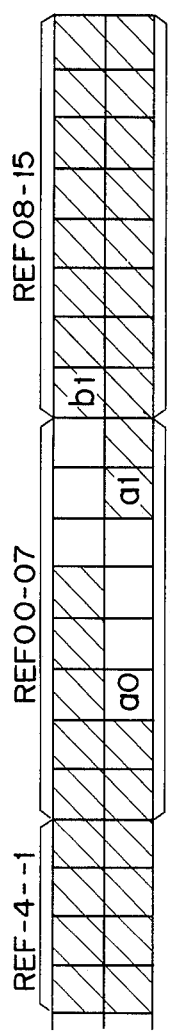

Selector 60 selects data from register 62 as data from the LSB of image data to be generated to a bit position on the left side of a bit position indicated by a0 pointer RBPA 100, and selects data from barrel shifter 50 as data from the bit position indicated by the a0 pointer to the 7th bit. Here, data of a0 pointer RBPA 100 is latched in pointer 56 in this manner, an image pattern which is completed in the previous step from the hold loop formed by selector RRSEL 64 is fed back and loaded to a data portion on the left side of point a0, and new image data is loaded to a data portion from point a0 to the MSB (the 15th bit) of data RODT, regardless of the position of point a1, as shown in FIG. 7B. As will be described later, since point a1 serves as point a0 in the next processing step and image data corresponding to the next run is generated on the right side thereof, a currently-generated run has a length corresponding to the decoded result at that time.

The output of adder A01BP 112 is connected to comparator 122 for checking if the output from adder 112 is 8 or more. When the output from adder A01BP 112 is 8 or more, signal SNAGR8 is generated from comparator 122. If this signal is not generated, this means the image data for the run length data to be currently processed is generated only in data RODT00-07 of register 62. Therefore, controller 1 operates to complete generation processing for this run length data within this step.

In this example, since the output from adder A01BP 112 is 6, no signal SNAGR8 is generated, and the generation processing for this run length data is completed in this step. Upon completion of run generation processing, the output from adder A01BP 112 is loaded to a0 pointer RBPA 100 through selector 114 and image pointer RBPQ 54, through selectors 114 and 54. Thus, the contents of pointers 100 and 56 are updated to "6". The above generation processing is parallel-performed within one machine cycle.

FIG. 7A illustrates the state when this machine cycle is completed. In FIG. 7A, points a0, a1, and b1 are indicated in view of the generated run. This state corresponds to the initial state of the generation processing for the next black run. For the generation processing of the black run, i.e., in the next machine cycle, point a1 in FIG. 7A serves as point a0, and point b1 falls outside the range of FIG. 7A. Generation of a black run in the next machine cycle and thereafter will be described below.

As described above, the contents of a0 pointer RBPA 100 and image pointer RBPQ 54 are "6". This means that the 6th bit of data RODT07-00 of register 62 corresponds to point a0.

If decoding section 13 has decoded a V(0) code in a previous machine cycle, i.e., in a machine cycle where image data generation processing is performed on the basis of the VL(2) code, since run length $\delta = 0$, "$-4$" is input to RL counter 42. Since a black run is to be generated, flip-flop FBLKP is "1".

In this state, point b1 is not detected. This is informed to controller 1 by data A2. However, image generation is performed regardless of the presence/absence of point b1 detection in the same manner as in the previous cycle, and all the bits from the 6th bit to the 15th bit of data RODT15-00 of register 62 are set to "1". Referring to FIG. 7B, a data portion consisting of all "1" bits is generated from a point indicated by a1 toward the right. The content on the left side of a point indicated by a0 pointer RBPA 100, i.e., data portion RODT 06-00 of data RODT15-00 of data remains unchanged upon operation of the hold loop. In this manner, one-byte image data consisting of black data RODT01-00, white data RODT05-02, and black data RODT07-06 is completed. Therefore, flip-flop FODRDY (not shown) of controller 1 is set to output the content of data RODT00-07.

Since one-byte image data of data RODT07-00 is completed, one-byte image data on the right side thereof is generated in the next processing step. Preparation therefor is performed in this processing step.

More specifically, the content of register 96 is left-shifted by one byte, so that the next image data (of the reference line) read out from reference line buffer 94 is loaded to data REF08-15. In other words, the content of data REF04-07 is loaded to data REF-4--1, and the content of data REF08-15 is loaded to data REF00-07, so as to realize the one-byte shift operation.

In synchronism therewith, "8" is subtracted from the content of a0 pointer RBPA 100. This means that point a0 is shifted to the left by one byte with reference to data REF. The bit on the left side of minus fourth bit is not present in b1 detector 102. When the content of pointer 100 is smaller than $-4$, it is set to be $-4$. This can be attained by a simple circuit although not shown. Even if the content of a0 data is in portion REF 11- $-4$, b1 point can be detected.

Selector 114 receives the content of a0 pointer RBPA 100, and calculates "a0−8". Selector 114 selectively supplies the calculated result to a0 pointer RBPA 100. In this, 8 yields $-2$, and $-2$ loaded to a0 pointer RBPA 100 is 6, 6−8 yields $-2$, and $-2$ is loaded to a0 pointer RBPQ 100. The countent of image pointer RBPQ 56 is left unchanged until the generation processing for the corresponding run is completed.

Figure 7C:
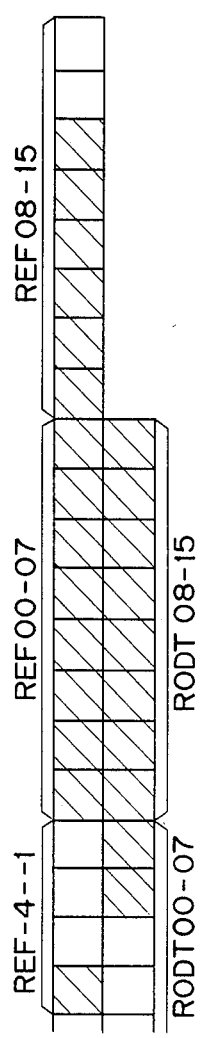

FIG. 7C illustrates a state when this processing step is completed and control enters the next processing step. Since data REF is illustrated at the same position in the drawings, it can be understood that image pattern data is shifted by one byte, as compared to FIG. 7B. This is because register 62 holds an already-processed image byte in data RODT07-00. Selector RRSEL 64 is driven by control flip-flop FODRDY described above, so that data RODT15-08 is selected and supplied to the hold loop of selectors 64 and 60 thus compensating for a deviation between data REF and RODT.

More specifically, byte data RODT08-15 in register 62 in FIG. 7C is used for this generation processing step. The data RODT15-08 is input to selector 60 through selector 64. The byte image data in this processing step is generated in the same manner as described above. That is, in the processing step starting from the state shown in FIG. 7C, point b1 is not detected, and image generation continues for one more byte. At the end of this processing step, the 6-bit "1" data portion, i.e., data RODT13-08 of the left portion of 8 bits indicated by data RODT15-08 in FIG. 7C is input to the data RODT05-00 portion of register 62 through the hold loop (since the content of image pointer RBPQ 56 is left to be 6), and "1"s corresponding to a new generated black run from barrel shifter 50 are input to data RODT 15-06. Therefore, all the bits of RODT00-15 become "1".

Figure 7D:
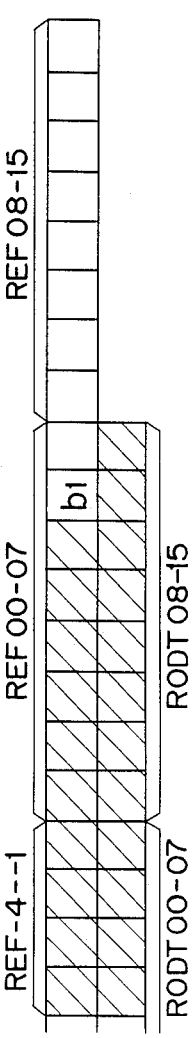

Data REF15-00 of register 96 is left-shifted by one byte, and $-4$ is input to a0 pointer RBPA 100, in the same manner as described above. This result is shown in FIG. 7D. In the next processing step, point b1 is detected at the 6th bit. 10($=6+4$) is output from b1 detector 102, and $-4$ is input to RL counter 42 in 7 correspondence with run length $\delta=0$ of VL(0). Therefore, 6($=10+(-4)$) is output from adder A01BP 112. Since this output is 7 or less, no signal SNAGR8 is generated. This indicates the end of run processing. Therefore, the output from adder A01BP 112, i.e., 6, is set in a0 pointer RBPA 100 and image pointer RBPQ 56. Although all the bits of data RODT15-00 are "1", since the output from adder A01BP 112 is 7 or less, control flip-flop FODRDY is reset, and this image byte is not output at this time, but used for generation processing of image data for the next run (white run).

In this manner, generation processing of code data encoded by the vertical mode is performed parallel to detection of point b1 on the reference line, thus greatly increasing the generation processing speed. In the case of a pass mode code, the generation processing of image data from point a0 to b1, shown in FIG. 7A, is performed in the same manner as in the case of a V(0) code. Then, a reference color for detecting white/black inversion of b1 detector 102 is inverted, and the same operation as for a V(0) code is performed while the color of an image pattern to be generated is left unchanged, thus generating image data from point b1, shown in FIG. 7A, to b1, shown in FIG. 7D.

Compression processing will now be described with reference to FIG. 7.

First, compression processing for an MH code will be described. Image pattern data is input to latch 22 from an input data bus and is latched thereby. The input image data is input to register 26 through inverter 24. At this time, register data RDTI07-00 is output to reference line storage section 4 as reference line data for the next processing line, and is stored therein in accordance with data from address register 88. Also, image data held in data portion RDTI 07-00 is output to a1 detector 104, and data 320(2560÷8) is preset in RL counter 42. The a1 point, detected by a1 detector 104, is output as data D to selector 38 via selector 114.

Thereafter, 9 bits are selected by funnel shifter 30 in accordance with indication data of decoding pointer 36 in the same manner as in the expansion processing, and are output to selector 31. The output from funnel shifter 30 is selected by selector 31, and is output to decoder ROM 32. When a run with the same color for more than one byte length continues, "1000", i.e., data indicating a length of one byte, is output from decoder ROM 32 as data DROM11-08 to adder 34, and data J is then output to controller 1 as the result.

The value of decoding pointer 36 is not updated. Controller 1 outputs data Q to address counter 82 in the same manner as in expansion processing to update address data. Also, the content of RL counter 42 is count down At the same time, the contents of register 96 is shifted to the left by one byte in the same manner as in expansion processing. New reference line data read out from storage section 4 is output to register 96 and latched as REF 15-08. The value of pointer 100 is not changed.

In the one-dimensional mode in which the same color continues from the beginning of a run, a count pulse is input to RL counter 42 from controller 1 in accordance with data DROM 15-12 from decoder ROM 32, upon completion of processing for one byte, thereby counting down RL counter 42 as shown in ㉑ of FIG. 7. When a color change point a1 is detected by a1 detector 104, i.e., when the content of data LSHT08-00 is not "00000000" or "11111111", the count result of RL counter 42 is supplied to encoder ROM 46 via selector 44. Data N is also supplied to encoder ROM 46, thus generating a make-up code.

The generated make-up code is supplied via selector 48 to barrel shifter 50. The generated make-up code is rotated in barrel shifter 50 in accordance with the indication data of image pointer 56. The rotated code is supplied to data RODT 15-08 portion of register 62 and is also supplied to selector 60. In selector 60, the rotated code is combined with an output of selector 64 in the same manner as in the expansion processing, in accordance with the indication data of image pointer 56. At the same time, the length of the generated make-up code is output from encoder ROM 46 to adder 52 as data EROM07-05 to add it to the indication data. Again the sum is the indication data of pointer 56. When data 0 is output to controller 1, data RODT07-00 is output onto a output data bus.

When the length of make-up code to be generated is 6 to 10 bits, a remaining portion of the make-up code is generated from encoder ROM 46 and is processed in the same manner as described above. At this time, data RODT15-08 is selected in selector 64. After the generation processing of the make-up code is completed, 11-03-bit portion is cleared in RL counter 42, and the 02-00-bit portion is shifted to the 05-03-bit portion, and remaining data smaller than one byte is input to the 02-00-bit portion of RL counter 42. This result is also output to encoder ROM 46 and is processed in the same manner as in the make-up code, to output a compressed terminating code. Processing for the length of a code is the same as that for the make-up code. In this manner, the make-up and terminating codes in the case of compression processing of the horizontal mode are generated.

The horizontal mode codes encoded by the MR and M²R methods are processed in the same manner as compression processing of the MH code, except that the identification code of the horizontal mode is added before the first make-up code in accordance with data N from controller 1.

The compression processing of two-dimensional codes in the vertical and pass modes will be described. When a1 is not detected in data RDTI07-00 as data F and b1 is also not detected in data REF-3-10 from register 96, a skip processing is performed. In the skip processing, for example, a byte of a new image data pattern is input through the input data bus, and the reference line data in register 96 is updated. When both a1 and b1 are detected, the compression processing of two-dimensional codes is started.

Detected a1 and b1 are supplied to subtractor 120 and an output from subtractor 120 is output as data A to encoder ROM 46 via selector 44. In encoder ROM 46, the pass mode code or the vertical mode code is generated, and is processed in barrel shifter 50, selector 60, and image pointer 56, etc., in the same manner as in the horizontal mode code. At this time, b1 is selected in selector 114 and is supplied to a0 pointer 100 and decoding pointer 36 via selector 38 as data D. The following processing is the same as in expansion processing.

In the uncompressed mode, data is supplied directly to selector 48 from register 58, and is then output therefrom. The following processing is the same as in expansion processing. The code length is supplied to selector 110 a data B, and the data of image pointer 56 is updated by data B via adder 112, and selector 54.

What is claimed is:

1. A binary data compression and expansion processing apparatus which can generate image data having a length up to a predetermined length in one generation processing step, comprising:
   rotate-shifting means for rotate-shifting input image data in a preceding direction of the generation processing in accordance with an input bit position data;
   first holding means, having a first half portion and a second half portion, each having a predetermined length, for holding the rotate-shifting image data input to the second half portion, for holding input image data of an interest block the image data from ting the image data held in the first half in accordance with a data output instruction input thereto;
   first selecting means for selectively outputting one of the image data held in the first and second half portions of said first holding means; and
   combining means for selectively combining as the image data of an interest block the image data from said first selecting means and the image data from said rotate-shifting means in accordance with the input bit position data, and for outputting the combined image data to the first half portion of said first holding means.

2. The apparatus according to claim 1, wherein said combining means selects the image data from said first selecting means as the image data of the interest block from a leading bit position to a bit position immediately before a bit position designated by the bit position data, selects the image data from said rotate-shifting means as the image data of the interest block from the designated bit position to a last bit position, and combines the selected portion of the image data from said rotate-shifting means after the selected portion of the image data from said first selecting means.

3. The apparatus according to claim 1, wherein said first selecting means selects the image data held in the first half portion of said first holding means when the data output instruction is not input upon completion of an immediately preceding generation processing step, and selects the image data held in the second half portion of said first holding means when the data output instruction is input upon completion of the immediately preceding generation processing step.

4. The apparatus according to claim 3, wherein the data output instruction is input to said first holding means when a generated length of the combined image data is the predetermined length or more.

5. The apparatus according to claim 1, wherein the bit position data designates the bit position of the interest block for the leading bit of the image data to be combined next.

6. The apparatus according to claim 5, further comprising bit position designating means for holding the input bit position data, and for outputting the held bit position data.

7. A binary data compression and expansion processing apparatus which can detect in parallel a color change point of image data corresponding to an interest block, comprising:
   color inverting means for inverting a color of the image data input thereto as detecting image data; and
   color change point detecting means for inputting mask data for indicating a portion of the detecting image data positioned from a bit position next to an interest bit position to a last bit position, for inputting the detecting image data, for inputting the color-inverted image data in such a manner that the color-inverted image data is shifted by 1 bit in a detecting direction, and for detecting the color change point in accordance with the mask data, the detecting image data, and the color-inverted image data.

8. The apparatus according to claim 7, wherein each bit of the detecting image data is represented by logic "0" as a white run and by logic "1" as a black run, the mask data is logic "0" from a leading bit position to the interest bit position to a last bit position, and said color change point detecting means detects the color change point based on the logical sum of the mask data, the detecting image data, and the color-inverted image data.

9. The apparatus according to claim 7, further comprising color modulation means for modulating input image data in accordance with an input color control data, and for outputting the modulated image data as the detecting image data to said color-inverting means and said color change point detecting means.

10. The apparatus according to claim 9, wherein said color modulation means comprises exclusive OR gates equal to the bit number of the input image data, one terminal of each of said exclusive OR gates receives the corresponding bit of the input image data, each bit data being logic "0" as the white run and logic "1" as the black run, and the other terminal thereof receives the color control data as logic "0" in order to detect the color change point from the black run to the white run and as logic "1" in order to detect the color change point from the white run to the black run.

11. A binary data compression and expansion processing apparatus which can expand a code in parallel, comprising:
counter means for holding an input data corresponding to a run length data of the code, for counting down the held data by data corresponding to a first predetermined length for each generating step, for holding the counted-down data, and for outputting the held data;
generating means for inputting the held data in said counter means and control data, and for generating unicolor image data having the first predetermined length and a color designated by the control data, and for outputting the generated unicolor image data as combining image data;
holding loop means for generating image data by combining the combining image data after a remained image data held therein in accordance with input generation bit position data in one generating step, for outputting the generated image data in a region for the second predetermined length beginning from a leading bit thereof as an interest block when it is detected that the length of the generated image data is the first predetermined length or more, and for holding the remained image data for next generating step, the generation bit position data indicating a bit position within the interest block where the next combining image data is to be combined; and
bit position detecting means for determining a bit position where the next combining image data is to be combined in accordance with the held generation bit position data and the held data from said counter means, for holding the updated generation bit position data in accordance with the determined bit position, for outputting the generation bit position data held therein, and for detecting that the generated image data has the first predetermined length based on the determined bit position.

12. The apparatus according to claim 11, wherein the code is one-dimensional code data, the run length data input to said counter means is one of the run length data of a make-up code and a terminating code, and said bit position detecting means does not update the generation bit position data and detects that the generated image data has the first predetermined length in each generating step, and the generating steps proceed, while the image data for the make-up code and a portion of the terminating code having the run length equal to or more than the first predetermined length is generated, and updates the generation bit position data when the image data for a portion of the terminating code having the run length less than the first predetermined length is generated.

13. The apparatus according to claim 11, wherein said holding loop means comprises:
rotate-shifting mean for rotate-shifting the input combining image data in a preceding direction of the generation processing in accordance with the input generation bit position data;
first holding means, having a first half portion and a second half portion each having the first predetermined length, for holding the rotate-shifted combining image data input to the second half portion as the remained image data, for holding input generated image data in the first half portion, and for outputting the generated image data held in the fist half portion when the image data for the first predetermined length or more is generated;
first selecting means for selectively outputting one of the image data held in the first and second half portions of said first holding means; and
combining means for selectively combining as the image data of the interest block the generated image data from said first selecting means and the image data from said rotate-shifting means in accordance with the generation bit position data, and for outputting the combined image data to the first half portion of said first holding means.

14. The apparatus according to claim 13, wherein said combining means selects the remained image data from said first selecting means as the image data of the interest block from a leading bit position to a bit position immediately before a bit position designated by the bit position data, selects the rotate-shifted combining image data from said rotate-shifting means as the image data of the interest block from the designated bit position to a last bit position, and combines the selected portion of the image data from said rotate-shifting means after the selected portion of the image data from said first selecting means.

15. The apparatus according to claim 13, wherein said first selecting means selects the image data held in the first half portion of said first holding means when it is not detected that the image data for the first predetermined length or more is generated upon completion of an immediately preceding generation processing step, and selects the image data held in the second half portion of said first holding means when it is detected that the image data for the first predetermined length or more is generated upon completion of the immediately preceding generation processing step.

16. The apparatus according to claim 13, further comprising:
fourth holding means for holding input uncompressed mode code block, and for outputting the held block as the combining image data, the block having logic "1" at the last bit position; and
fourth selecting means for selectively outputting one of the combining image data from said generating means and the combining image data from said fourth holding means, and wherein the run length data for the uncompressed mode code block is input to the counter means.

17. The apparatus according to claim 16, wherein the bit position data is updated in accordance with the uncompressed mode code block, and it is detected by said bit position detecting means that the generated image data has the first predetermined length based on the determined bit position.

18. The apparatus according to claim 13, wherein said bit position detecting means comprises:
bit position designation means for holding the generation bit position data input thereto, and for outputting the held generation bit position data input thereto, and for outputting the held generation bit position data;
second holding means for holding data indicating a detection-end point, and for outputting the held data as point data;
adding means for adding the input point data and the held data from said counter means, and for outputting the added result;
second selecting means for selecting one of the added result from said adding means and data subtracted from the point data by data corresponding to the first predetermined length, and for outputting the selected data to said bit length, and for outputting the selected data to said bit position designation means as the bit position data and to said second holding means as the detection-end point data; and
comparing means for comparing the added result from said adding means with the data corresponding to the first predetermined length in order to detect that the image data for the first predetermined length or more is generated, and
said bit position detection means further comprises:
b1 detecting means for inputting reference line data corresponding to the interest block, for detecting the b1 point in the reference line data from the detection-end point in a detecting direction, and for outputting data indicating the detected b1 point as point data; and
third selecting means for selectively outputting one of the point data from said second holding means and the point data from said b1 detecting means to said adding means as the point data.

19. The apparatus according to claim 18, wherein said third selecting means select the point data from said b1 detecting means when the image data for the vertical mode code and the pass mode code is generated, and selects the point data from said second holding means when the portion of the terminating code has the run length less than the first predetermined length.

20. The apparatus according to claim 18, wherein the control data input to said generating means designates a white color when first make-up and terminating codes of a horizontal mode code and a second vertical mode code of each pair of vertical mode codes are decoded, and designates a black color when second make-up and terminating codes of a horizontal mode code and a first vertical mode code of each pair of vertical mode codes are decoded, and the color designated by the control data is not changed when the pass mode code is decoded.

21. The apparatus according to claim 18, wherein the code is two-dimensional code data, the run length data for one of a make-up code, a terminating code, a vertical mode code, and a pass mode code is input to said counter means, and wherein the detection-end point data in said third holding means is not updated and it is not detected that the generated image data has the first predetermined length in each generating step, and the generating steps proceed, while the image data for the make-up code and a portion of the terminating code having the run length equal to or more than the first predetermined length, and wherein the detection-end point data in said third holding means is updated and it is detected by said comparing means that the generated image data has the first predetermined length in each generating step, when the image data for the vertical mode code, the pass mode code, and a portion of the terminating code has the run length less than the first predetermined length.

22. The apparatus according to claim 21, wherein the detection-end point data in said third holding means is not updated and it is not detected by said comparing means that the generated image data has the first predetermined length in each generating step when the b1 point is not detected in a generating mode of the vertical mode code and the pass mode code, and the generating steps proceed.

23. The apparatus according to claim 18, wherein said b1 detecting means comprises:
color inverting means for inverting a color of the reference line data input thereto as detecting image data; and
color change point detection means for inputting mask data for indicating a portion of the detecting image data positioned from a bit position next to a bit position indicated by the detection-end point data to a last bit position, for inputting the detecting image data, for inputting the color-inverted image data in such a manner that the color-inverted image data is shifted by 1 bit in the detecting direction, and for detecting the b1 point in accordance with the mask data, the detecting image data, and the color-inverted image data.

24. The apparatus according to claim 23, wherein each bit of the detecting image data is represented by logic "0" as a white run and by logic "1" as a black run, the mask data is logic "0" from a leading bit position to the bit position indicated by the detection-end point and logic "1" from a bit position next to the bit position indicated by the detection-end point to a last bit position, and said color change point detecting means detects the b1 point based on the logical sum of the mask data, the detecting image data, and the color-inverted image data.

25. The apparatus according to claim 23, further comprising color modulation means for modulating the reference data in accordance with input color control data, and for outputting the modulated data as the detecting image data to said color-inverting means and said color change point detecting means.

26. The apparatus according to claim 25, wherein said color modulation means comprises exclusive OR gates equal to the bit number of the input reference data, one terminal of each of said exclusive OR gates receives the corresponding bit of the input reference data, each bit data being logic "0" as the white run and logic "1" as the black run, and the other terminal thereof receives the color control data as logic "0" in order to detect the b1 point from the black run to the white run and as logic "1" in order to detect the b1 point from the white run to the black run.

* * * * *